United States Patent [19]

Parstorfer

[11] Patent Number: 4,753,509

[45] Date of Patent: Jun. 28, 1988

[54] RECEPTACLE FOR LIGHT WAVEGUIDE SPLICE CONNECTIONS HAVING ADHESIVE GLUE GRIPPING MEANS

[75] Inventor: Richard Parstorfer, Geltendorf, Fed. Rep. of Germany

[73] Assignee: Siemens Aktiengesellschaft, Berlin and Munich, Fed. Rep. of Germany

[21] Appl. No.: 924,318

[22] Filed: Oct. 29, 1986

[30] Foreign Application Priority Data

Nov. 8, 1985 [DE] Fed. Rep. of Germany ....... 3539707

[51] Int. Cl.⁴ .............................................. G02B 6/38
[52] U.S. Cl. ................................ 350/96.20; 350/96.21
[58] Field of Search ........................... 350/96.20, 96.21

[56] References Cited

U.S. PATENT DOCUMENTS

| 4,029,390 | 6/1977 | Chinnock et al. ............ 350/96.2 |
| 4,183,616 | 1/1980 | Benoit et al. ............ 350/96.21 X |
| 4,254,865 | 3/1981 | Pacey et al. ............ 350/96.21 X |
| 4,662,713 | 5/1987 | Davies et al. ............ 350/96.21 X |

FOREIGN PATENT DOCUMENTS 3306502 8/1984 Fed. Rep. of Germany .

Primary Examiner—Paul Gensler
Attorney, Agent, or Firm—Hill, Van Santen, Steadman & Simpson

[57] ABSTRACT

A receptacle for splice connections of light waveguides comprises a splicing plate having guide grooves. To hold the waveguides on the splicing plate, adhesive glue is provided preferably in two parallel extending strips on each side of the splicing plate in recesses which are formed therein.

8 Claims, 1 Drawing Sheet ively useful when incorporated in a receptacle AE in FIGS. 1 and 2. The receptacle AE comprises a series of exactly dimensioned grooves NT1 through NTn which are arranged parallel to one another. Corresponding

RECEPTACLE FOR LIGHT WAVEGUIDE SPLICE CONNECTIONS HAVING ADHESIVE GLUE GRIPPING MEANS

BACKGROUND OF THE INVENTION

The present invention is directed to holding means or a receptacle for splice connections of light waveguides which are arranged in guide grooves of a splice plate.

A holding means or receptacle of this species or type is known from German OS No. 33 06 502. The problem is solved by making it expedient to arrest or hold the light waveguide to a certain degree for the actual splicing event. If, for example, one attempts to achieve a clamping of the light waveguide by a corresponding constriction of the guide groove, then the disadvantage occurs that only precisely defined fiber diameters can be faultlessly deposited. Moreover, a special mounting plate or the like is required for inserting the waveguides into the clamping location and endangerment of the fiber at the clamping location will occur due to such a holding or gripping.

SUMMARY OF THE INVENTION

The object of the present invention is to provide a holding of light waveguides in a particularly simple and gentle way. This is achieved in accordance with the present invention by an improvement in a holding means or receptacle for splice connections of light waveguides which are arranged in guide grooves of a splicing plate. The improvement comprises providing zones coated with an adhesive glue that forms a gripping means for holding the light waveguides in a fashion of a slicing comb in the guide grooves. These zones are provided in the region of the entry locations for the light waveguides into the splicing plate.

The only additional cost thus required by the present invention is the application of the adhesive glue which can be applied in a simple work step. Since the holding by the gripping means of the adhesive glue does not lead to any greater mechanical stressing of the light waveguides, it assures that no inadmissible high mechanical stresses are exerted on the optical waveguides.

A particularly advantageous improvement of the invention is characterized in that the receptacle is provided with a depression running at right angles relative to the light waveguides. The floor or base of this depression is coated with the adhesive glue. In this way, adhesion regions for the light waveguides, which are defined with particular clarity, are produced and the introduction of the adhesive glue into this depression can also be executed in a simple and reliable fashion.

Other objects and advantages of the present invention will be readily apparent from the drawings, following description and claims.

DESCRIPTION OF THE PREFERRED EMBODIMENTS

Figure 1:
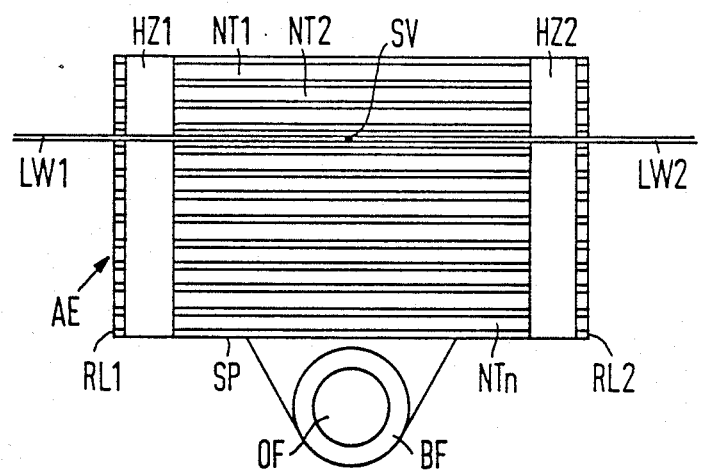
FIG. 1 is a plan view of a receptacle according to the present invention.
Figure 2:
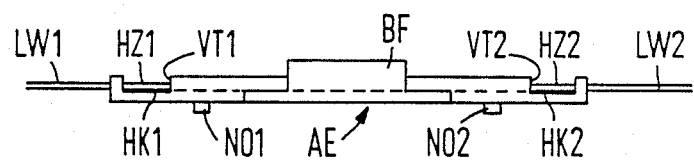
FIG. 2 is a side view of the receptacle of FIG. 1.

The principles of the present invention are particularly useful when incorporated in a receptacle AE in FIGS. 1 and 2. The receptacle AE comprises a series of exactly dimensioned grooves NT1 through NTn which are arranged parallel to one another. Corresponding light waveguides are laid into these grooves so that a splice connection SV, which is in the form of a welded connection, comes to lie roughly in the center of the receptacle or plate AE. In the present example, only two light waveguides LW1 and LW2 have been shown in order to simplify the illustration. The splice connection location SV of these two light waveguides lies roughly in the middle of the receptacle AE, namely, in the region which is to be referred to as a splicing plate and which is referenced SP. The receptacle AE also comprises a lateral fastening part BF which is provided with an opening OF by means of which it can be mechanically held in a splicing cassette or housing (not shown). Cams or projections NO1 and NO2 (FIG. 2) extend from the underside of the receptacle AE and these form an anti-twist device for the receptacle and are held in corresponding depressions of, for example, a splicing cassette or housing.

The grooves NT1 through NTn expediently comprise a rough V-shape cross section so that it is desirable that the light waveguides LW1 and LW2 are subject to an additional holding in the fashion of a splice comb. This is achieved in that two depressions VT1 and VT2 are provided in the edge regions of the receptacle AE. These depressions or recesses proceed at right angles relative to the longitudinal axes of the grooves NT1 through NTn. A coating of adhesive glue HK1 and HK2 are applied on the base or floor of these depressions VT1 and VT2 respectively so that the holding zones HZ1 and HZ2 occur and have a width which is advantageously selected to be in a range of 2 and 5mm. The dimensioning of the depressions VT1 and VT2 is thereby undertaken such that the inserted light waveguide LW1 and LW2 come into contact with the adhesive glue HK1 and HK2 in the inserted conditions and thereby experience a holding in the fashion of a splicing comb. The channel-like depressions VT1 and VT2 are coated with the adhesive glue HK1 and HK2 in a simple way and the light waveguide LW1 and LW2 are retained in their position with adequate reliability yet without excessively great mechanical stresses. The adhesive HK1 and HK2 is a pressure sensitive adhesive.

At the outer region, the depressions VT1 and VT2 also followed by two edge strips RL1 and RL2 which are likewise provided with channel-like depressions and effect an additional stabilization of the light waveguides. The channel-like depressions of the edge strips RL1 and RL2 can be "V"-shaped grooves which are aligned with the grooves NT1–NTn. The coatings are still preserved for the light waveguides LW1 and LW2 in the region of the edge strips RL1 and RL2, in the region of the holding zone HZ1 and HZ2 and in the outer part of the guide grooves NT1 through NTn which are, for example, 5mm wide. Only in the splicing region SV are the fibers stripped of their coatings or jackets.

It is also possible to make do without the depressions VT1 and VT2 and to introduce the adhesive glue directly into the guide NT1 through NTn. This, however, leads to certain difficulties so far as the grooves have extremely small dimensions so that an adequate, complete and all around coating with the adhesive glue requires somewhat greater care during processing.

The illustrated comb element or receptacle can also be a fixed for example, in a plastic cassette or housing.

Although various minor modifications may be suggested by those versed in the art, it should be understood that I wish to embody with the scope of the patent granted hereon, all such modifications as reasonably and properly come within the scope of my contribution to the art.

I claim:

1. In a receptacle for splice connections of light waveguides which are arranged in guide grooves of a splicing plate, said receptacle having two ends, the improvements comprising gripping means adajcent each end and at entry locations of the light waveguides into the splicing plate, said gripping means comprising a depression proceeding at right angles relative to the guide grooves adjacent each end, each depression having a base being coated with an adhesive glue to form a zone coated with the adhesive glue.

2. In a receptacle according to claim 1, wherein the width of the base is selected to be between 2 and 5mm.

3. In a receptacle according to claim 1, wherein each of the depressions is spaced inward from the ends of the receptacle to form edge strips, said edge strips having guide grooves aligned with the guide grooves of the splicing plate.

4. In a receptacle according to claim 1, wherein the dimensions of the depressions are selected so that light waveguides proceeding in the guide grooves are still certain to contact the adhesive glue in the base of said receptacles.

5. In a receptacle according to claim 4, wherein the width of the adhesive zones in the depression is selected to be in a range of 2 and 5mm.

6. In a receptacle according to claim 4, wherein the depressions forming the gripping means are spaced inward from the ends of the receptacle to form edge strips, said edge strips having guide grooves aligned with the grooves of the splicing plate.

7. In a receptacle for splice connections of light waveguides, said receptacle having a planar plate-like structure with guide grooves extending parallel thereon between two ends to form a splicing plate, the improvements comprising waveguide gripping means for holding the waveguides in the guide grooves, said gripping means comprising a pair of parallel recesses formed in said plate extending at right angles to the guide grooves with a recess adjacent each end and adjacent an entry location of the light waveguides into the grooves of the splicing plate, each recess having a base covered with a strip of adhesive glue.

8. In a receptacle according to claim 7, wherein each of said recesses is spaced inward from the ends of the plate forming the receptacle to form edge strips having guide grooves aligned with the grooves of the splicing plate.

* * * * *